Patented Aug. 9, 1949

2,478,404

UNITED STATES PATENT OFFICE 2,478,404

SUBSTANCE EXTRACTED FROM GROWTH MEDIUM OF RHIZOPUS NIGRICANS AND METHOD OF OBTAINING THE SAME

John C. Keresztesy, Westfield, and Edward Rickes, Rahway, N. J., assignors to Merck & Co., Inc., Rahway, N. J., a corporation of New Jersey No Drawing. Application May 19, 1944, Serial No. 536,434

2 Claims. (Cl. 260—236.5)

This invention relates to a new chemical compound, rhizopterin, which is capable of promoting growth of certain organisms, and to processes for obtaining said compound.

By the term "rhizopterin" as herein employed is meant a pterin-like acidic chemical compound having a molecular weight of the order of 350; an approximate carbon-hydrogen-nitrogen content of 53% carbon, 4.0% hydrogen and 25% nitrogen, the remainder being oxygen; and a characteristic ultraviolet absorption spectrum as follows:

| pH → | 12.6 | 7.0 | 1.3 |
|---|---|---|---|
| $\lambda$ Å. | 2,575 | 2,440 | 2,525 |
| $Em \times 10^{-3}$ | 18.6 | 11.7 | 12.5 |
| $\lambda$ Å. | 2,650 | 2,700 | ----- |
| $Em \times 10^{-3}$ | 14.1 | 10.8 | ----- |
| $\lambda$ Å. | 3,650 | 3,500 | 3,225 |
| $Em \times 10^{-3}$ | 4.3 | 3.44 | 4.4 |

Rhizopterin is further characterized by high activity in promoting growth of *S. lactis* although relatively inactive in promoting growth of *L. casei*. One gamma of rhizopterin has substantially the same potency for *S. lactis* as about 56 gamma of standard folic acid concentrate, although the same amount of rhizopterin is less active than about 0.0004 gamma of this folic acid standard for *L. casei*. Rhizopterin is but slightly soluble in water, insoluble in organic solvents, soluble in alkali solutions, and when heated, darkens indicating decomposition without melting at 310–330° C.

This new chemical compound, rhizopterin, is obtained according to one process within the scope of this invention from a charcoal adsorbate prepared by treating a fumaric acid fermentation liquor with activated charcoal. The fumaric acid fermentation liquor used for this purpose is a typical growth medium wherein an organism, for instance *Rhizopus nigricans*, is propagated to produce fumaric acid and the adsorbate is obtained by mixing activated charcoal, for instance Norite A, with the liquor, filtering and washing.

The following examples illustrate methods of carrying out the present invention, but it is to be understood that these examples are given by way of illustration and not of limitation.

Example 1

About 180 pounds of moist charcoal adsorbate equivalent to about 90 pounds of dry material, obtained as above described, are eluted for about an hour with approximately 150 gallons of ethanol (30% by volume) containing sodium hydroxide (about 0.25% by weight). The eluate is filtered, acidified with dilute sulfuric acid to about pH 2–3, and mixed with approximately a kilogram of activated charcoal. After an hour, the mixture is filtered and the residue is washed with water. About 2 kilograms (dry weight) of this residue are eluted for an hour with a solvent consisting of 15 gallons of ethanol (95%), 33.25 gallons of water and about 3100 cc. of sodium hydroxide solution (30% by weight). The mixture is then filtered, the filtrate neutralized and concentrated to a total volume of about 12 liters. The concentrated solution is carefully acidified to about pH 4 causing formation of a precipitate which is removed, preferably by centrifugation, washed with ethanol, water, and acetone, and dried in vacuo. About 150 gms. of this concentrate are suspended in approximately 1500 cc. of ammonium hydroxide solution (6–7 normal) and the mixture is stirred for several hours after which insoluble matter is removed preferably by centrifugation. The clarified supernatant liquor is then mixed with approximately 10 volumes of absolute ethanol and the mixture is again centrifuged, after which insoluble material is removed. The clear solution is acidified with acetic acid to a pH of 4.5–5.0 and again precipitated matter is removed by centrifugation. The clarified solution is chromatographed batch-wise upon aluminum oxide, and after washing with alcohol the aluminum oxide is eluted with a solvent consisting of five parts methanol, one part concentrated ammonia, water and sufficient distilled water to make a total volume of 10 parts. The elution is conducted batch-wise using portions of solvent successively upon the same aluminum oxide and the fractions exhibiting most pronounced microbiological activity are selected for further operations. The selected eluate fractions are combined and concentrated in vacuo (40–45° C.) to a total volume of approximately 120 cc. About 100 cc. of concentrated ammonia water are added to this concentrate together with two liters of absolute ethanol. If a precipitate forms it is removed before further operations. The solution is then acidified with glacial acetic acid to pH 4.5–5 and any precipitate formed upon standing is removed. The clarified solution is chromatographed upon aluminum oxide followed by washing with 500 cc. of ethanol (95%), followed by methanol (50%). The aluminum oxide is then eluted as before using a solvent consisting of methanol, water, and concentrated ammonium hydroxide, the concentrate of ammonium hydroxide may be 1/10 of the above and other bases can be used. Again microbiological assays are used to select potent eluate fractions. These fractions are concentrated in vacuum at a temperature of 30–40° C. to a volume of approximately 20 cc. A yellow semi-crystalline material separates which is removed by filtration, washed with water and alcohol and dried in vacuum. The product is purified by forming a solution of same in ammonium hydroxide, clarifying the solution by centrifugation and adding absolute ethyl alcohol to cause separation of the ammonium salt of rhizopterin as aggregates of fine yellow needles. The ammonium salt, when dissolved in water and the solution carefully acidified with acetic acid to pH 6 yields buff rhombohedron-like micro crystals of rhizopterin which, if desired, can be further purified by repeating the crystallization procedure above described. The product possesses the properties set forth above in the definition of the term rhizopterin.

*Example 2*

A charcoal adsorbate from fumaric acid fermentation liquor is eluted with alcoholic sodium hydroxide solution and the eluate is acidified, treated with activated charcoal, the charcoal removed, washed and eluted with a solvent consisting of ethanol, water and sodium hydroxide as in the foregoing example. 150 gallons of this eluate are diluted with water to approximately 300 gallons, and dilute sulfuric acid is added to pH 2.5. The solution is treated with suitable quantity of fuller's earth which is separated by filtration and eluted with about 30 gallons of ethanol (50%) containing about 10% ammonium hydroxide. The eluate is separated from fuller's earth by filtration and the filtrate is evaporated in vacuo until free of ammonium hydroxide, or until its volume is approximately 4 liters. The precipitate formed is separated by centrifugation, washed with water and alcohol, and dried. About 50 gms. of this dried product are suspended in about 1500 cc. of hydrochloric acid (½ normal) and insoluble matter is removed by filtration or centrifugation. About 10 volumes of ethanol are added to the filtrate and the pH is adjusted to 3–4.5 by addition of dilute sodium hydroxide solution. Insoluble material is removed by filtration and the solution is chromatographed upon aluminum oxide, then eluted with methanol (50%) containing 10% ammonium hydroxide. Eluate fractions are selected as in the foregoing example, combined, and rechromatographed after which again active eluate fractions are selected and rechromatographed again. The selected fractions are combined and concentrated in vacuo at 30–40° C. to a total volume of approximately 20 cc. Yellowish micro crystals of rhizopterin separate and are removed by filtration. This is purified by conversion to the ammonium salt which, if desired, is reconverted to rhizopterin by the procedure set forth in Example 1.

Salts of rhizopterin other than the ammonium salt above described can be prepared by treating rhizopterin solutions with weak organic bases.

Modifications may be made in carrying out the present invention without departing from the spirit and scope thereof and the invention is to be limited only by the appended claims.

What is claimed is:

1. The process for obtaining rhizopterin that comprises eluting, with alkaline aqueous ethanol, a charcoal adsorbate of a fumaric acid fermentation liquor obtained from the growth medium of *Rhizopus nigricans*, acidifying the eluate and mixing with activated charcoal, separating and eluting the charcoal with alkaline aqueous ethanol, acidifying this eluate and mixing with fuller's earth, separating and eluting the fuller's earth with ammoniacal aqueous ethanol, concentrating this eluate to cause separation of crude rhizopterin as a precipitate, separating and drying this precipitate, dissolving the precipitate in aqueous hydrochloric acid, adding alcohol, then alkali to pH 3–4.5, removing separated impurities, chromatographing the solution on aluminum oxide, eluting the aluminum oxide with ammoniacal aqueous methanol, evaporating the eluate to obtain rhizopterin.

2. A substance selected from the class consisting of rhizopterin and the ammonium salt of rhizopterin, the rhizopterin being obtained by eluting, with alkaline aqueous ethanol, a charcoal adsorbate of a fumaric acid fermentation liquor obtained from the growth medium of *Rhizopus nigricans*, acidifying the eluate and mixing with activated charcoal, separating and eluting the charcoal with alkaline aqueous ethanol, acidifying this eluate and mixing with fuller's earth, separating and eluting the fuller's earth with ammoniacal aqueous ethanol, concentrating this eluate to cause separation of crude rhizopterin as a precipitate, separating and drying this precipitate, dissolving the precipitate in aqueous hydrochloric acid, adding alcohol, then alkali to pH 3–4.5, removing separated impurities, chromatographing the solution on aluminum oxide, eluting the aluminum oxide with ammoniacal aqueous methanol, evaporating the eluate to obtain rhizopterin, said rhizopterin having an approximate carbon-hydrogen-nitrogen content to 53% carbon, 4.0% hydrogen, and 25% nitrogen, the balance being oxygen, and being further characterized by being but slightly soluble in water, insoluble in organic solvents, soluble in alkali solutions, and, when heated, darkening indicating decomposition without melting at 310–330° C.

JOHN C. KERESZTESY.
EDWARD RICKES.

REFERENCES CITED

The following references are of record in the file of this patent:

Foster et al., J. Am. Chem. Soc., vol. 61, pp. 127–135 (January 1939).

Chem. Abstrs. 3410, by Foster (1939), vol. 33.